United States Patent [19]

Piepho

[11] 4,308,139
[45] Dec. 29, 1981

[54] APPARATUS FOR THE PURIFICATION OF OILY EMULSIONS, SOLUTIONS, AND INDUSTRIAL WASTE WATERS

[76] Inventor: Ralf F. Piepho, Deisterstr. 58, 5015 Wennigsen, BRD, Fed. Rep. of Germany

[21] Appl. No.: 201,980

[22] Filed: Oct. 29, 1980

Related U.S. Application Data

[60] Division of Ser. No. 936,706, Aug. 25, 1978, Pat. No. 4,234,424, which is a continuation of Ser. No. 827,250, Aug. 24, 1977, abandoned.

[51] Int. Cl.³ .............................................. B01D 33/32
[52] U.S. Cl. .................................. 210/241; 210/400; 210/401
[58] Field of Search ............... 210/400, 401, 241, 386, 210/283, 387; 162/348; 100/151-154, 118-120; 34/163, 208, 209, 111, 116-121

[56] References Cited

U.S. PATENT DOCUMENTS

| | | | |
|---|---|---|---|
| 2,734,377 | 2/1956 | Traver | 210/401 |
| 2,964,191 | 12/1960 | Arnold et al. | 210/241 |
| 3,244,287 | 4/1966 | Stavnton | 210/387 |
| 3,864,266 | 2/1975 | Dietrick | 210/387 |
| 3,896,030 | 7/1975 | Bahr | 210/386 |

*Primary Examiner*—Frank Sever
*Attorney, Agent, or Firm*—Norman Lettvin

[57] ABSTRACT

The invention relates to an apparatus for the purification of oily emulsions, solutions, industrial waste waters or the like. The apparatus includes a reaction container, at least one discharge connecting piece, an inflow trough and a band filter fitted with a fleece band, a filtrate container arranged under it and a sludge container provided at the discharge end of the band filter.

13 Claims, 5 Drawing Figures

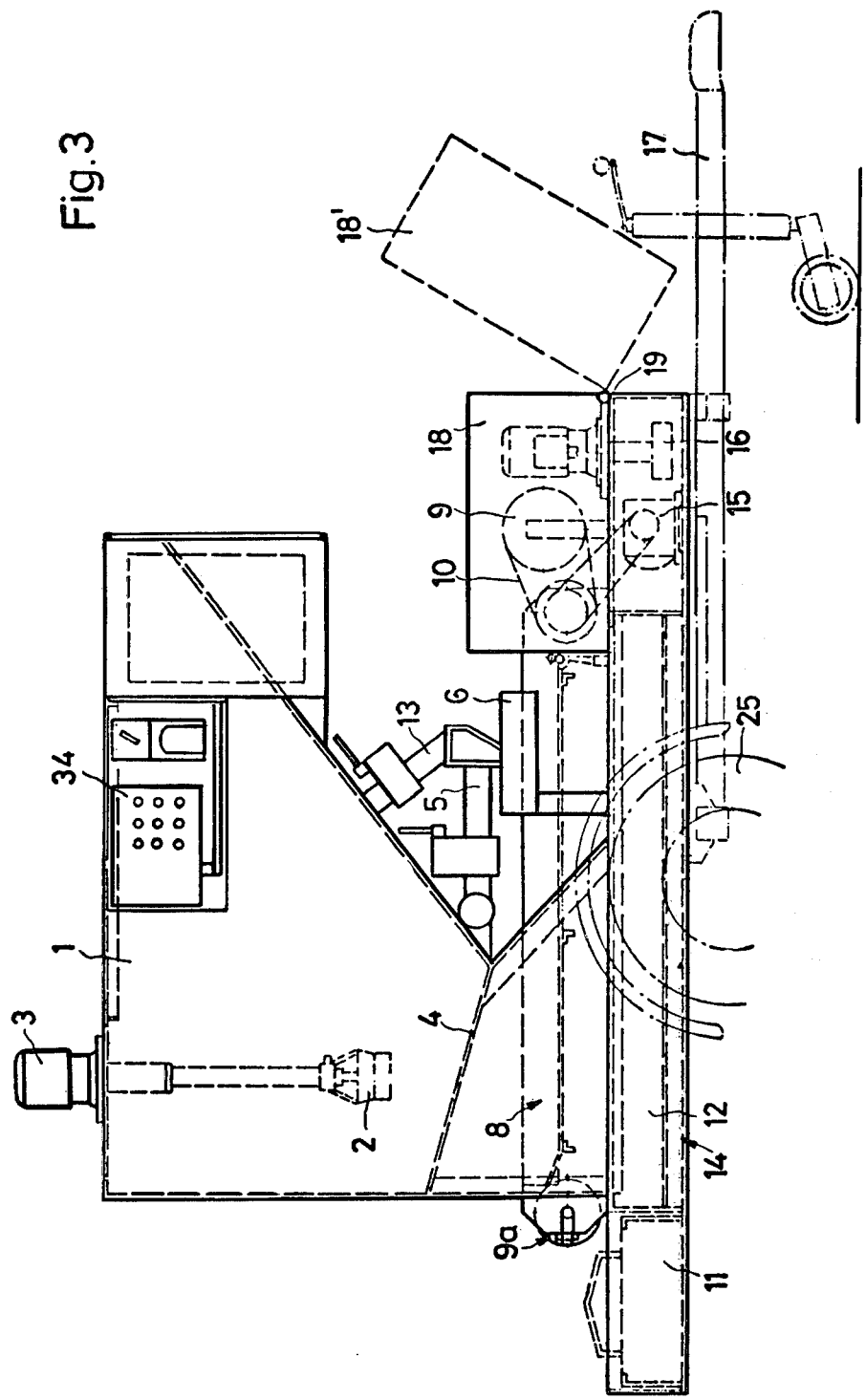

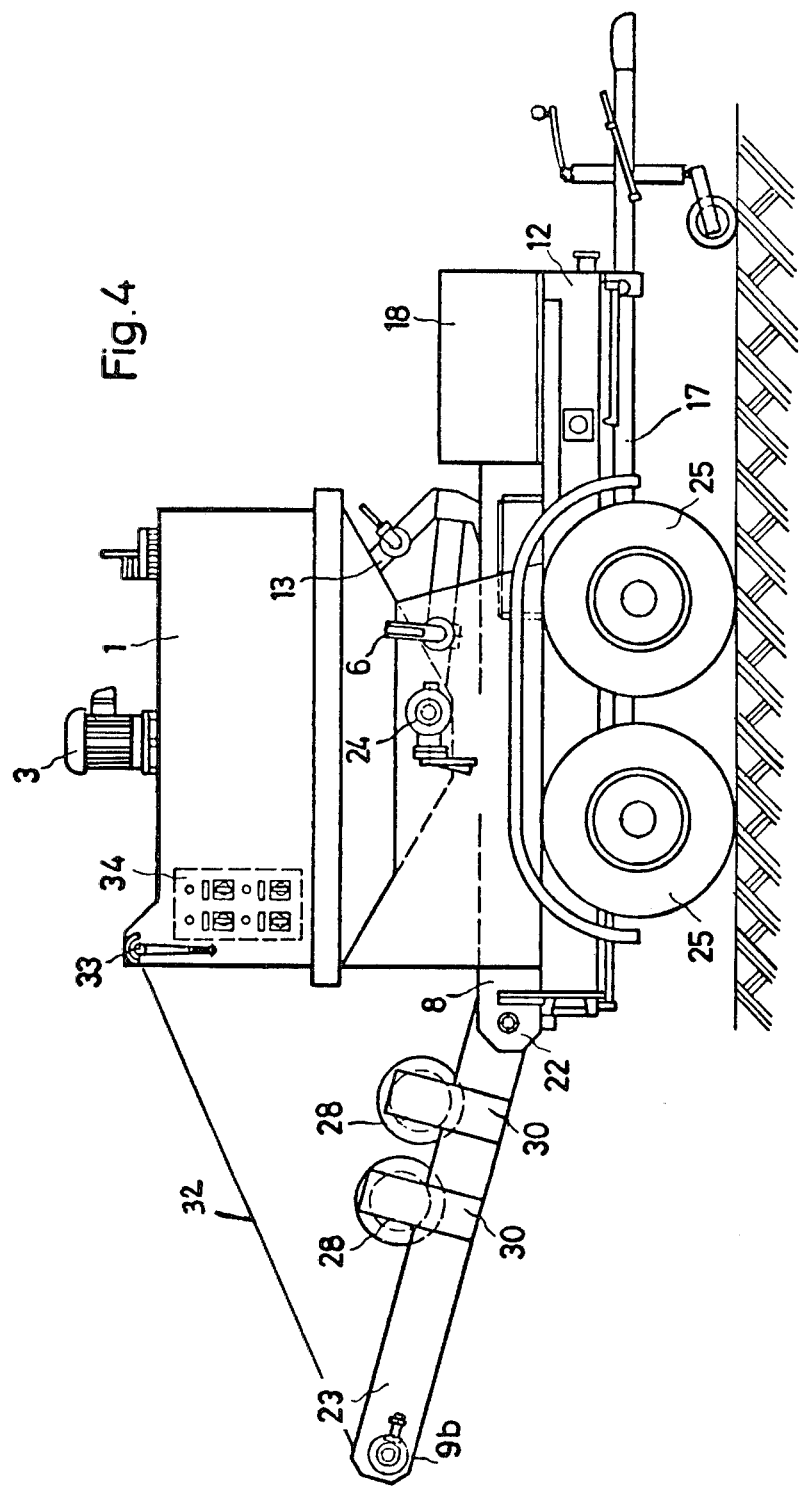

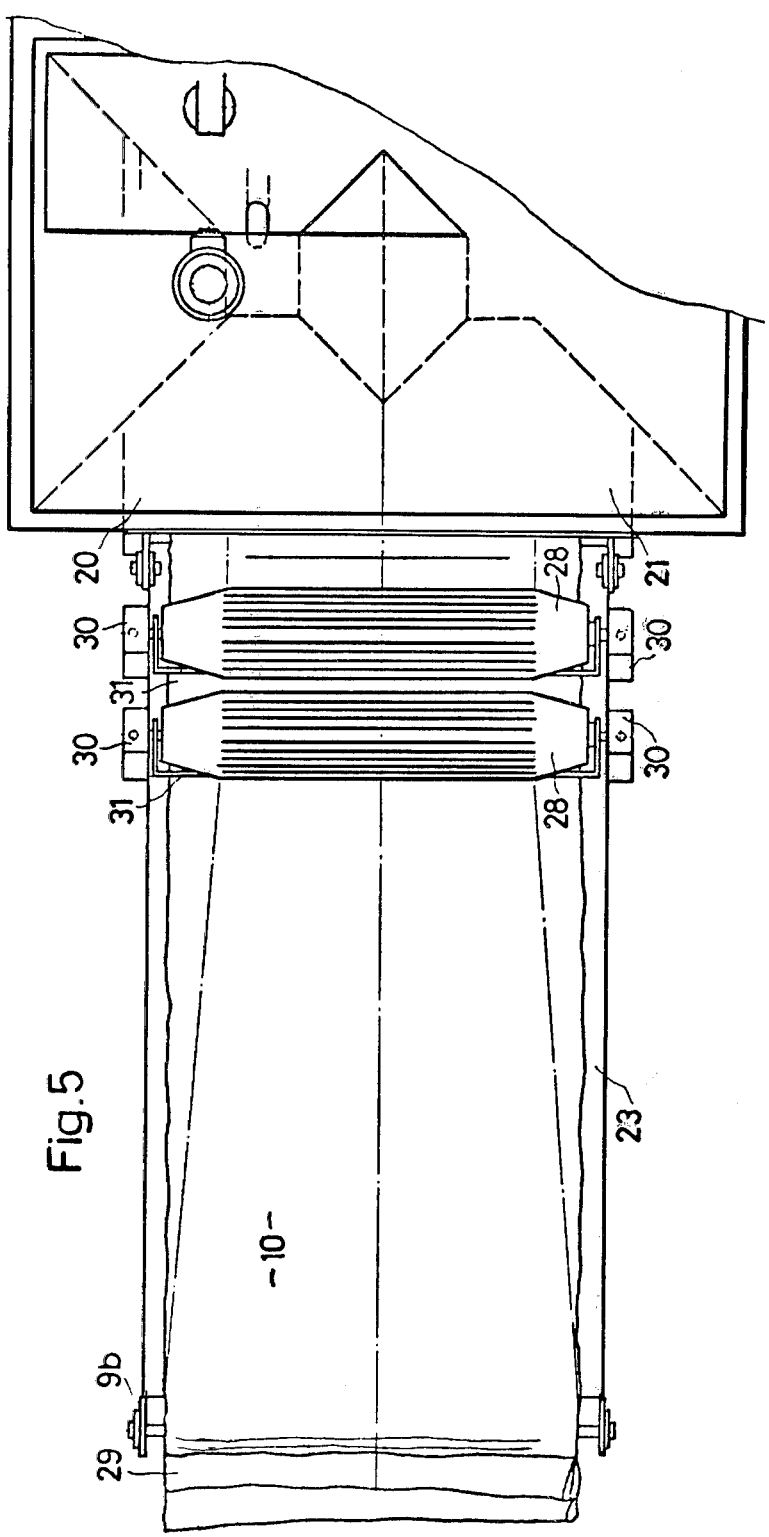

APPARATUS FOR THE PURIFICATION OF OILY EMULSIONS, SOLUTIONS, AND INDUSTRIAL WASTE WATERS

This is a division of Application Ser. No. 936,706 filed Aug. 25, 1978 now U.S. Pat. No. 4,234,424, which Application was itself a continuation of Application Ser. No. 827,250 filed Aug. 24, 1977, now abandoned.

FIELD OF THE INVENTION

This invention relates to a water purification apparatus for purifying and treatment of oily waste water, and to effect sludge removal, and more particularly to a mobile expression of such an apparatus.

BACKGROUND OF THE INVENTION

Oily industrial waste waters can seriously disturb biological drainage processes. The emulsified oil particles hamper normal aerobic biological purification in settling installations as the oil film on the water surface prevents the absorption of atmospheric oxygen.

Therefore, wash waters from such industrial installations as oil and gasoline separators, paper and carpet factories, barrel washing plants, factories for the degreasing of machine parts, and plants using coolant emulsions for machining operations must be purified to meet government standards as to allowable percentages of mineral oils.

One type of purification process with which the apparatus of the instant invention is concerned involves chemical separation. Such a process, to be low cost, uses demulsifying products and chemically reacting adsorbents to achieve an adsorption of the separating reagent as well as an extremely high, fine distribution of the substances to be eliminated. Adsorbed dirt particles and oily organic substances become firmly bound and finely distributed in a resulting sludge cake. These adsorbed dirt particles are not dissolved by normal mechanical treatments so that their reemergence under normal environmental conditions is virtually excluded.

The process for purification by chemical separation includes collecting the oily waste waters, adding a demulsifier if the oil content exceeds 2% and separating, or draining, the oil which floats to the surface. A powdered separating reagent may be mixed into the emulsion with adsorption occurring in a very short period of time.

Another object of this invention is to provide an improved purification apparatus that can be transported to the site where contaminated emulsions, solutions, industrial waste waters or the like occur.

The performance of prior waste water treatment and sludge removal apparatus have been hampered by the amount of "down-time" consumed while the treatment chamber of the apparatus was filled with the waste water to be treated. It was also discovered that sludge drained from a treatment chamber did not normally have sufficient time to dry.

Thus, a further object of this invention is to increase overall performance in waste water treatment by providing in an apparatus two treatment chambers, such that one may operate while the second is being filled, and by also providing that sludge produced by the apparatus is provided with an elongated drying path.

Another object is to provide an apparatus for handling waste taken from a solution by a continuous napped, or fleece-like, filter band of a disposable character such as a paper-like band.

BRIEF DESCRIPTION OF THE DRAWINGS

Examples of execution of the invention are represented in the drawings and are described in the following.

FIG. 3 an apparatus in side view, in which, instead of the lengthened band filter part there is provided a catching box for the sludge;

FIG. 4 an apparatus according to FIG. 1 with a two-axle chassis and the lengthened swingably mounted band filter part; and FIG. 5 a plan view of the swingable discharge end of the band filter part with press rollers.

DETAILED DESCRIPTION OF THE DRAWINGS

Figure 1:
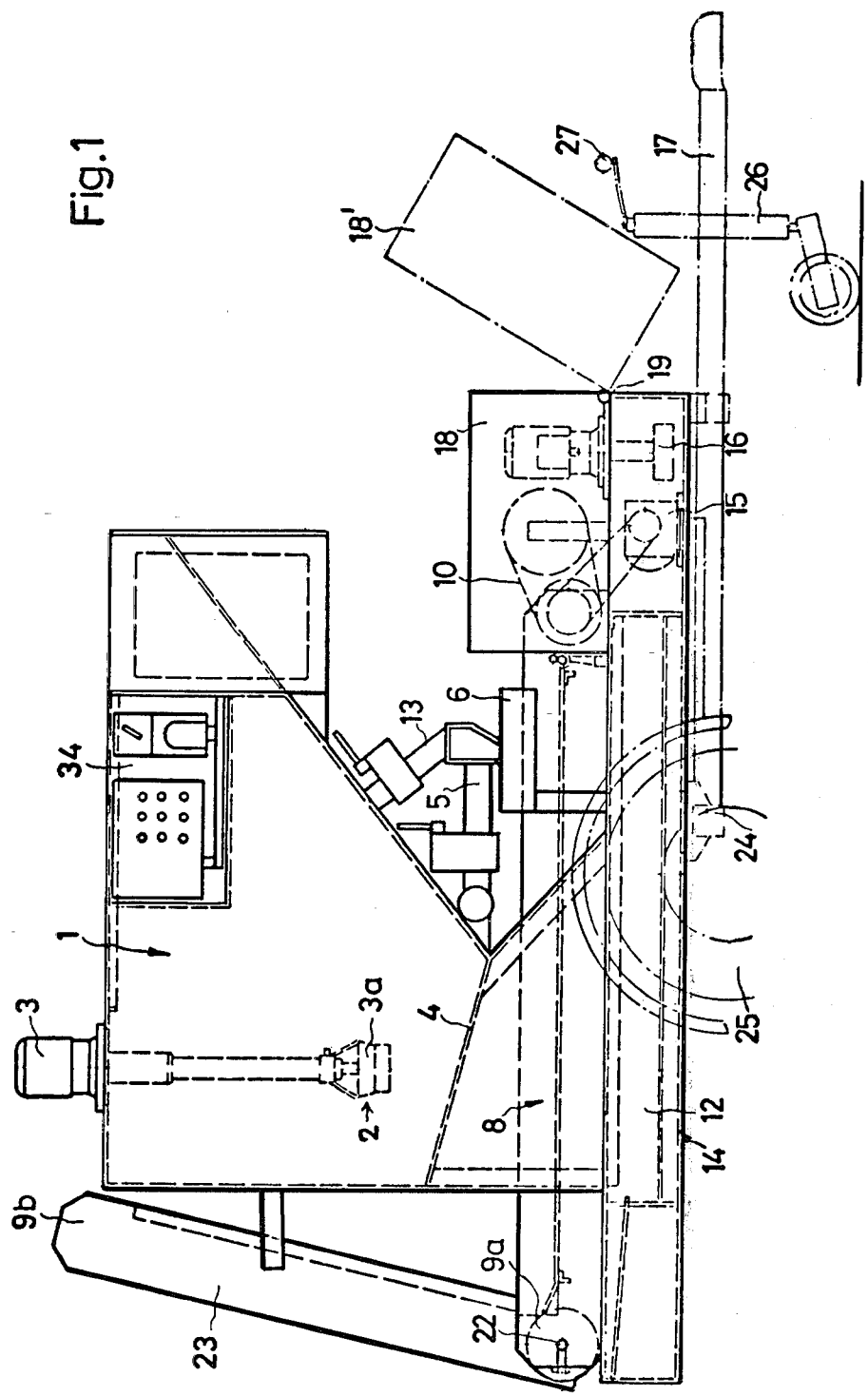
FIG. 1 shows a working-up apparatus provided with a chassis in side view.

In the example of a preferred form executed according to FIG. 1, the apparatus for the processing of used emulsions, solutions, industrial waste waters or the like has a reaction chamber, or tank, 1 which is equipped with a mixing turbine 2 which is driven through a motor 3 supported above the chamber. In the reaction container 1 there is collected in the region of the bottom 4 the sludge solution, which is drawn off through a connecting pipe piece 5 and fed to an inflow trough 6 that is laterally elongated to spread the sludge mixture received from pipe piece 5. This inflow trough 6 has a widened bottom provided with perforations. Through these perforations the sludge falls onto a wide band filter 8, whose endless conveyor belt consists of mesh wire or the like. To the upper surface of the conveyor belt there is supplied from a roll 9 a fleece, or napped, band 10 which runs with the upper course of the conveyor belt 8 up to the discharge end 9a of the band filter and takes on the sludge. On the discharge end there is provided a sludge tank 11 which receives the sludge together with the fleece band. In the transport of the sludge along the band filter the liquid separating from the sludge passes through the fleece band 10, runs through the meshes of the conveyor belt 8 and passes down into a filtrate container 12 arranged underneath the band filter. The liquid collecting above the sludge layer in the lower portion of the reaction container 1 is drawn off through a connecting pipe piece 13 and fed to the inflow trough 6, from which the liquid passes onto the band filter 8 and into the filtrate container 12.

The apparatus may be mounted on a motor vehicle trailer 14. The fleece roll 9, the drive 15 for the band filter 8 and the pump 16 associated with the filtrate container 12 are provided on the end facing the draw-rod 17. These parts are enclosed by a casing, the cover 18 of which is hinged about a horizontal axis 19. In the swung-out position the cover 18 occupies the position shown in dot-and-dashed lines in FIG. 1.

On the rear end of the trailer there is provided the sludge tank 11.

Preferably, however, the vehicle trailer is omitted and the filtrate container 12 arranged under the apparatus is constructed to also serve as chassis and carrier of the traveling mechanism upon which axles 24, wheels 25 and draw-rod 17 are secured in a suitable manner directly to the filtrate container 12. If desired, the draw-rod 17, which has the function of a wagon pole, can be arranged detachably. In the front part of the draw-rod 17 there is arranged a support wheel 26 which is extensible and retractable over the crank 27.

Figure 2:
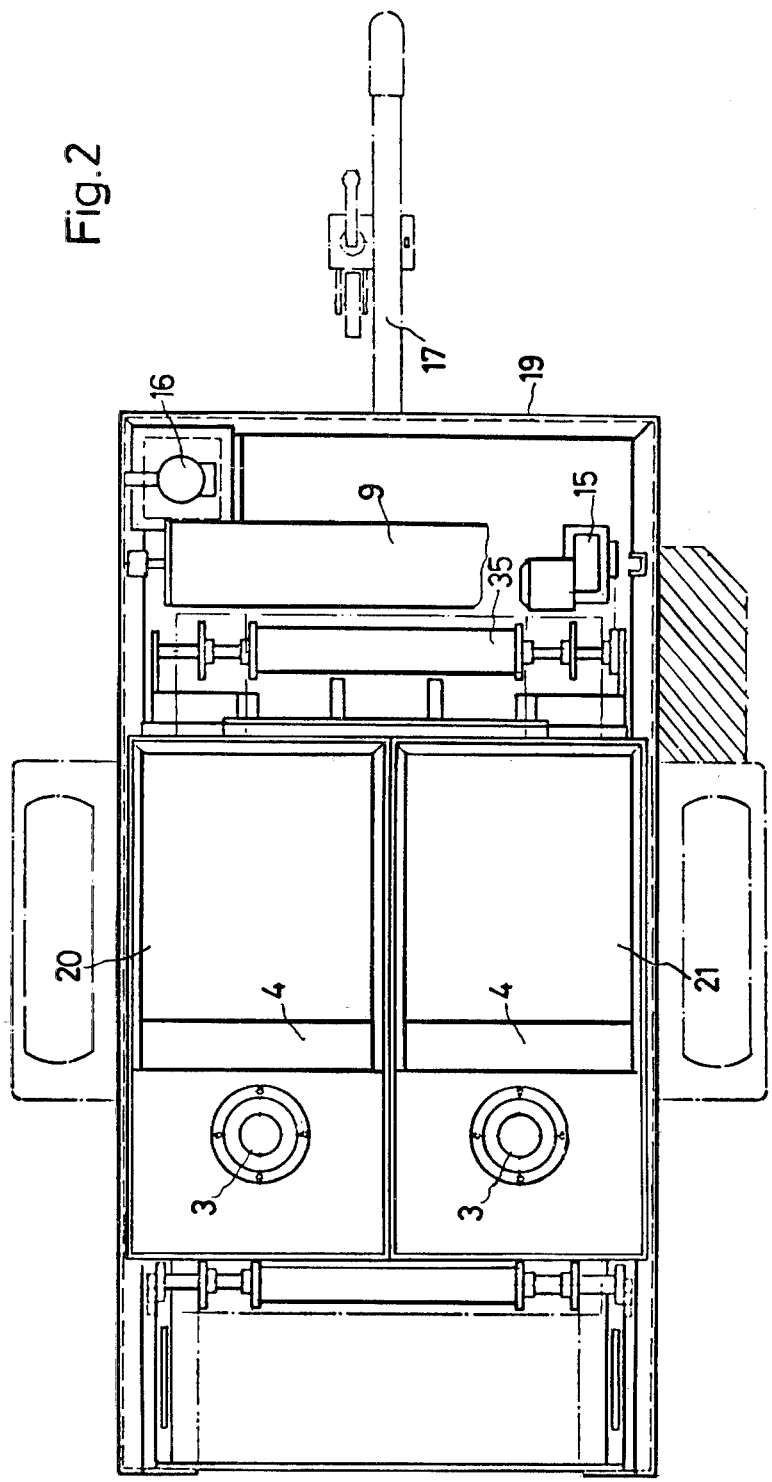
FIG. 2 an apparatus according to FIG. 1 in plan, in which the reaction container is subdivided into two chambers.

In the modified form example of execution according to FIGS. 2 and 5 the reaction container has two chambers 20, 21, to each of which there is allocated a separate mixing turbine 2. While the one chamber is being filled, in the other chamber the working-up operation as described above can be running.

In the example of execution according to FIGS. 1, 4 and 5 the band filter 8 has a discharge end section 23 hinged about a horizontal axis 22, which discharge end section is designed to extend beyond the end of the trailer in the unfolded position. The part extending beyond the rear end of the trailer is designed to extend upwardly at a pitch of about 15° in its operating position, with respect to the portion of the conveyor 8 fastened to the trailer. This hingeable part 23 is provided with a filtrate container which in this case is provided with a gradient to drain toward the filtrate container, which is mounted on the trailer. The filtrate runs, accordingly, into the tank 12 and can be drawn off from tank 12 with a pump 16.

By using the foldable part 23 of the band filter the length of the band filter 8 is increased, and the drying interval for the sludge is increased. At the discharge end of part 23 there is provided a sludge tank which receives the sludge and the fleece band.

In pursuance of the idea of the invention, in FIG. 4 on the fold-out part 23 of the band filters there are suspendably arranged squeezing rollers 28, which are again to be seen in FIG. 5 in a plan view. These rollers made preferably of hard rubber with a steel core, which press with their weight on the filter cake 10', situated on the fleece band and moving through with this under the squeezing rollers, so that a further constituent of water or liquid is pressed or squeezed out of the filter cake and a relatively dry crumbly material results. At 29 there is shown the fleece band dropping from the endless conveyor belt. This fleece band is preferably a paper fleece.

The squeezing rollers 28 are borne in lateral brackets 30 movable up and down in direction radial of the rollers, and carry in each case a blade-form stripper 31 which lies with one edge against the surface of the roller to scrape off the roller and discharge onto the filter cake any material sticking to the surface of the roller. In FIG. 5 there is shown a reaction container with two chambers 20 and 21, in which the emulsion to be purified or to be dissolved is worked up with addition of the reagent. The separation of the emulsion takes place in these chambers, and in this manner there can be carried out virtually a continuous operation by mixing reagent with the emulsion to be separated in the one chamber, while the mixture is just being run off from the other chamber, i.e., let off onto the band filter. The hingeable part of the band filter that carries the reference number 23, can be of various length and is connected over a draw cable 32 with a winch 33 in order to fold it up or to lower it to a varying distance. It can, however, also be provided with laterally spaced supports (not shown) which would swing down to support the folded-down part 23 upon the ground. At 34 there is to be seen the controls mounted on a panel of the apparatus. In FIG. 4 there is designated a valve 24 through which the reaction container may be selectively emptied. The deflection roll 9b for the conveyor belt, on which the napped filter band rests, and which filter band preferably consists of a mesh wire, is shiftably arranged at the outer end of the foldable part of the band filter, so that the conveyor belt can be correspondingly tensioned. The rear deflection roller for the conveyor belt is designated with 35. It is clearly to be perceived from FIG. 2. The drive for the conveyor belt is designated at 15.

While one form of the invention has been described, it will be understood that the invention may be utilized in other forms and environments, so that the purpose of the appended claims is to cover all such forms of devices not disclosed but which embody the invention described herein.

I claim:

1. In an apparatus for the treatment and separation of sludge from a liquid-sludge mixture, the apparatus including container means for receiving thereinto, and treating and mixing therein, a liquid-sludge mixture, and a conveyor means for receiving and transporting material discharged from the container means so as to effect air drying of the sludge; the improvement comprising, in combination:

the conveyor means including a moving, endless, foraminous belt trained over laterally spaced rollers to provide an upper elongated belt course moving continuously during the drying of sludge from a first end toward a discharge end and a lower elongated belt course, below said upper belt course, returning from said discharge end to said first end;

a napped filter strip, supplied from a source thereof to lie above the upper surface of the moving upper course of the endless belt, in a position to take on liquid-sludge discharged from the container means and to be held by the weight of said sludge against the upper course of the endless belt to be transported therewith;

a laterally elongated, spreading trough means spaced above only a portion of the filter strip for discharging a lateral spread of liquid-sludge mixture under gravity onto only a portion of the filter strip when said filter strip passes beneath said trough means above the upper course of the endless, foraminous belt, whereby liquid filtrate from the mixture continuously passes through the filter strip as the filter strip moves toward the discharge end of said upper belt course, and a sludge residue, dried by the increasing absence of liquid in said liquid-sludge mixture, remains on the filter strip;

an elongated filtrate-receiving container positioned to lie beneath the lower course of said endless belt, for receiving thereinto filtrate that has passed through the filter strip and through the courses of the foraminous belt;

and the filter strip with dried sludge residue thereon being discharged from the discharge end of the upper course of the endless belt as said endless belt completes its transport of the filter strip along said upper course of the belt.

2. An apparatus as in claim 1 wherein the foraminous belt is elongated beyond said filtrate-receiving container to increase the sludge-drying period in which the sludge is carried by the conveyor means.

3. An apparatus as in claim 2 wherein a portion of the conveyor means extending beyond said filtrate-receiving container is articulated to swing up to an inoperative position when not in use.

4. An apparatus for the treatment of liquid-sludge mixtures as in claim 3 wherein means are provided for positioning the pivotable portion of the foraminous conveyor means at an angle of about 15 degrees upwardly and rearwardly with respect to the non-projecting portion of the foraminous conveyor means.

5. Apparatus for the treatment of liquid-sludge mixtures as in claim 4 wherein the positioning means comprises a cable winch to control the angle of the pivotable filter band portion.

6. Apparatus for the treatment of liquid-sludge mixtures as in claim 3 and further including squeeze rollers associated with a portion of the foraminous conveyor, the rollers including removable brackets positioning strip blades for the removal of sludge particulate from the external roller surface.

7. An apparatus as in claim 2 including an elongated mobile trailer means for selectively moving the treatment apparatus to a site where liquid sludge mixture is held for treatment, a portion of the conveyor extending beyond the rear end of the trailer means, said portion of the conveyor means that extends beyond the rear end of the trailer means being articulated to swing up to an inoperative position for storage.

8. An apparatus as in claim 4 wherein the filtrate container is elongated and also functions as the body of the trailer means.

9. Apparatus for the treatment of liquid-sludge mixtures as in claim 4, further including means for driving the foraminous conveyor and means for pumping liquid from the filtrate container:
   the napped filter strip roll, the drive means and the pump means arranged at the forward end of the mobile trailer means; and
   a cover swingable about a horizontal axis for encapsulating the napped filter strip roll, drive means and pump means.

10. An apparatus as in claim 1 wherein the container includes at least two separate reaction chambers, each with its own mixer means; and each chamber being operable independently of the other.

11. An apparatus as in claim 1 wherein the container means includes at least two separate reaction chambers each with its own mixer means; and means for selectively discharging a quantity of treated liquid-sludge from one of the reaction chambers into the spreading trough means, while the other reaction chamber is treating another quantity of liquid-sludge, whereby a substantially continuous operation may be achieved.

12. In a conveyor type filter that includes a pool of liquid-sludge mixture to be filtered, movable perforate conveyor means, a consumable sheet of filter medium means on the conveyor for movement therewith, and filtrate-receiving container means for receiving filtrate that passes through the filter medium;
   the improvement comprising, in combination: container means spaced and separate from said conveyor and said sheet of filter medium for providing a pool of liquid-sludge and permitting therein substantial separation by gravity of sludge from the liquid;
   the conveyor means being an endless, foraminous, continuously moving belt trained over laterally spaced rollers to provide an upper elongated belt course moving continuously from a first end toward a discharge end and a lower elongated belt course, below said upper belt course, returning from said discharge end to said first end;
   an elongated filtrate-receiving container positioned to extend beneath the length of the lower elongated perforate belt course to receive therein filtrate that passes under force of gravity through the filter medium and both said upper and lower belt courses;
   a source of napped filter strip arranged to feed from said source and to lie above the upper surface of said upper belt course and to move therewith, in a position to take on a mixture of gravity-separated sludge and liquid discharge from said pool within the container, the weight of the discharge from said pool providing means for holding the filter strip against the upper course of the continuously moving endless conveyor means to cause the filter strip and discharge retained thereon to move with said upper course of the conveyor means;
   and a laterally elongated, spreading trough means spaced above only a portion of the filter strip and arranged to receive gravity-separated liquid-sludge from the bottom of the pool in said container means and causing such sludge to spread laterally in the trough means and to then discharge by gravity onto only a portion of the filter strip adjacent the first end of the upper course of the conveyor means, whereby liquid will continuously drain through the filter strip and through both courses of the conveyor means to the filtrate-receiving container as the upper course of the conveyor moves continuously toward its discharge end, and the gradually liquid-freed drying residue is carried upon the filter strip from the point of receiving discharge from the spreading trough means toward said discharge end of the conveyor means.

13. A filter as in claim 12 further including at least one laterally elongated squeeze roller with a central portion of maximum diameter adapted to engage and pressure the sludge on the napped filter strip against a conveyor course below said filter strip, said central portion of the squeeze roller having a length less than the width of the napped filter strip.

* * * * *